United States Patent [19]

Bystrianyk et al.

[11] Patent Number: 4,504,301
[45] Date of Patent: Mar. 12, 1985

[54] INDIVIDUALLY CONTROLLED INTERCEPTORS FOR GLASSWARE FORMING MACHINES

[76] Inventors: Wasyl Bystrianyk, 456 Bushy Hill St., Simsbury, Conn. 06070; Richard A. Walker, 11 Bradley Brook Dr., North Granby, Conn. 06060; Edward B. Gardner, 17 Loeffler Rd., Bloomfield, Conn. 06002; Michael A. Iacovazzi, 155 Evelyn Rd., Bristol, Conn. 06010

[21] Appl. No.: 430,318

[22] Filed: Sep. 30, 1982

[51] Int. Cl.³ .............................................. C03B 7/16
[52] U.S. Cl. ......................................... 65/66; 65/159; 65/160; 65/164; 65/165
[58] Field of Search ................... 65/66, 160, 165, 164, 65/159

[56] References Cited

U.S. PATENT DOCUMENTS

| 2,836,934 | 6/1958 | McLaughlin et al. | 65/165 |
| 3,418,096 | 12/1968 | Bathellier | 65/160 X |
| 3,594,146 | 7/1971 | Trudeau | 65/165 |
| 4,357,157 | 11/1982 | Cardenas-Franco et al. | 65/164 |
| 4,417,915 | 11/1983 | Dahms | 65/159 |

*Primary Examiner*—Arthur Kellogg

[57] ABSTRACT

An apparatus for individually controlling the delivery of each gob within a group of gobs intended for simultaneous delivery to the molds of a section of a multiple section glassware forming machine. In a multiple gob multiple section glassware forming machine adapted to receive a plurality of gobs simultaneously at each successively activated section of the machine, a corresponding plurality of interceptors are associated adjacent the paths of the gobs and may be selectively activated to reject selected ones of the gobs in each cycle of the machine.

8 Claims, 7 Drawing Figures

INDIVIDUALLY CONTROLLED INTERCEPTORS FOR GLASSWARE FORMING MACHINES

BACKGROUND OF THE INVENTION

1. Field of the Invention

The invention relates generally to an apparatus for controlling the delivery of gobs to glassware forming machines. More specifically, the invention relates to interceptor apparatus for selectively enabling or rejecting delivery of a gob to selected molds in a section of a multiple section glassware forming machine.

2. Description of the Prior Art

Prior art glassware forming machines of the individual section type form glassware from gobs of molten glass by the cyclic performance of a predetermined series of steps in each section of the machine. Each section generally contains one or more blank molds for receiving one gob per mold, means for performing a predetermined series of steps prior to transferring a parison to one or more corresponding blow molds within that section and means for performing another predetermined series of steps to form a final article of glassware. Each section periodically performs an identical series of steps sequentially in a predetermined firing order at phased times within the cycle of operation of the machine. In single gob machines, one gob is periodically distributed to each section which then produces one glassware article therefrom. In triple gob machines, three gobs are simultaneously distributed to each section which contains three sets of molds or mold pairs (i.e. corresponding blank and blow molds) and associated components for producing one glassware article from each gob.

Glassware forming machines generally operate in conjunction with a cyclically oscillating gob distributor for periodically and sequentially distributing gob groups (containing one or more gobs of molten glass) to each section, a feeder serving as a source of one or more streams of molten glass, shears for cutting each stream into gobs and an interceptor associated with each stream and interposed between the shears and the gob distributor for occasionally, as needed, intercepting the gobs to reject them and prevent them from passing to the distributor and on to a particular section. While the interceptor is sometimes considered as part of the gob distributor, as used herein it will be considered a separate mechanism. Prior art interceptors associated with multiple gob glassware forming machines are designed to operate simultaneously to either enable delivery of all gobs within the gob group or to disable same.

A prior art multiple gob interceptor is normally held retracted out of the way to enable the gobs to pass to the gob distributor. The motion of the interceptor between a retracted delivery position allowing the gobs to pass, and an extended intercept position rejecting gobs to a cullet chute, is controlled by a delivery enable signal associated with each section of the glassware forming machine. The delivery enable signal of a particular section is provided by that section's timing controller and is turned on at one predetermined point of the machine cycle and off at another predetermined point. During the on time gobs may be delivered to that section. Those skilled in the art will understand that gob delivery to that section at any other time must not occur because the section will be performing various other functions in order to produce finished glassware and will not be able to accept any gobs.

Each section of a glassware forming machine, must run through several cycles in order to stabilize each mold at the proper operating temperature to produce satisfactory glassware. In the operation of a forming machine prior to temperature stabilization there is a well-known tendency for the glassware to collapse when the blow molds open, thereby preventing the take out tongs from grasping the ware. The collapsed ware must be removed by the machine operator: a difficult task if all three molds of a section are active. Accessability to the inner mold is especially limited. Accordingly, it is an object of this invention that each mold pair be started individually, for example, the inner one first, so the operator may easily keep the molds free from collapsed glassware during the start up phase.

Additionally, there occasionally arises a need to stop glassware manufacture by a section because only one mold of that section is producing unsatisfactory glassware. In practice, the interceptor would be commanded to reject all gobs of the gob group intended for that section, thus unnecessarily ceasing production of satisfactory glassware in order to determine the cause of production of unsatisfactory glassware. Accordingly, another object of this invention is to individually control gob delivery to the molds within each section so that the operator may selectively enable delivery to only selected ones of the mold sets.

Examples of prior art interceptors may be seen in U.S. Pat. Nos. 2,047,507 and 3,594,146 showing a single interceptor associated with a single respective gob. U.S. Pat. No. 2,836,934 shows a single interceptor associated with two gobs simultaneously. There is no prior art interceptor disclosing means for controlling delivery of only selected ones of the gobs within a gob group.

SUMMARY OF THE INVENTION

The invention comprises, in a glassware forming machine adapted to operate in conjunction with a plurality of gob sources, means for rejecting a predetermined number of gobs from predetermined ones of said gob sources. More particularly, in a glassware forming machine adapted to periodically receive a group of gobs, each group including a plurality of gobs for being sequentially delivered to sequentially activated sections of said machine, said plurality of gobs being equal in number to the number of blank molds in each of said sections, each gob within each group being intended for delivery to a predetermined respective one of said blank molds within each section, the invention is the improvement comprising: a plurality of interceptor means equal in number to and associated with respective ones of said plurality of gobs for intercepting selected gobs to prevent their delivery to the intended mold, each interceptor means associated with a predetermined respective one of said molds in each of said sections; a plurality of activating means for selectively placing said interceptor means in an intercept position or in a delivery position, each activating means operatively connected to a predetermined respective one of said interceptor means; control means operatively connected to each of said activating means for selectively energizing and deenergizing selected ones of said activating means to intercept selected gobs within each of said groups of gobs while simultaneously permitting delivery of other gobs within the same group.

DESCRIPTION OF THE PREFERRED EMBODIMENT

Figure 1:
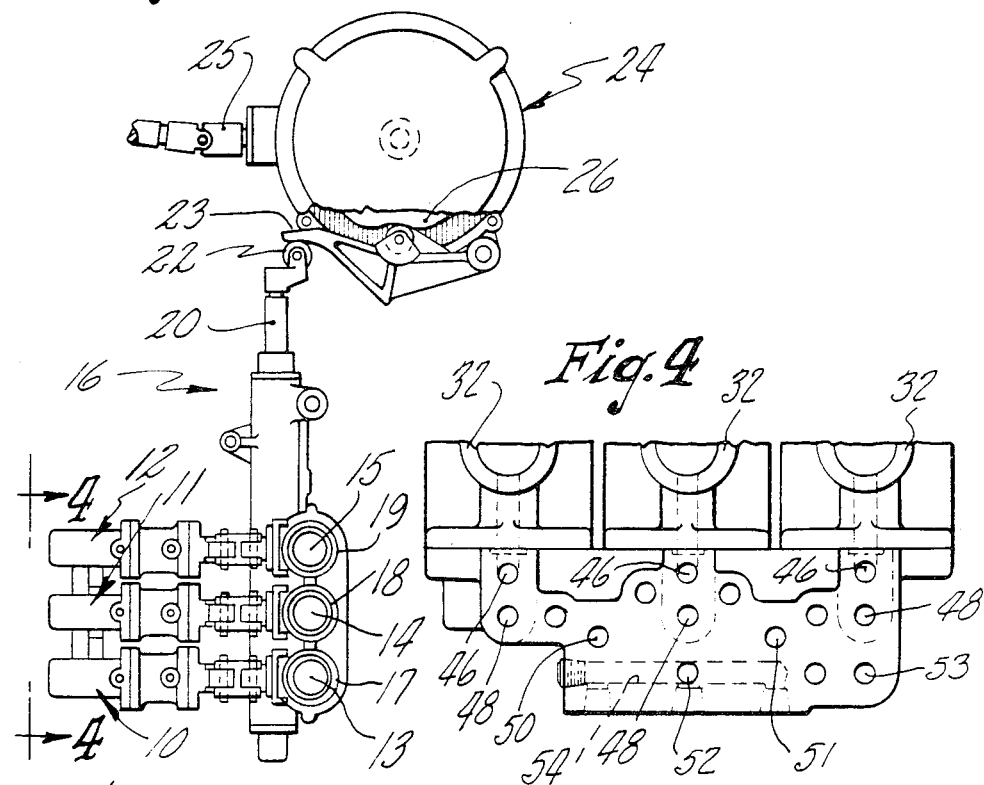
FIG. 1 shows a plan view of the preferred embodiment of a portion of the invention secured in proper orientation adjacent the gob distributor of a glassware forming machine.
Figure 2:
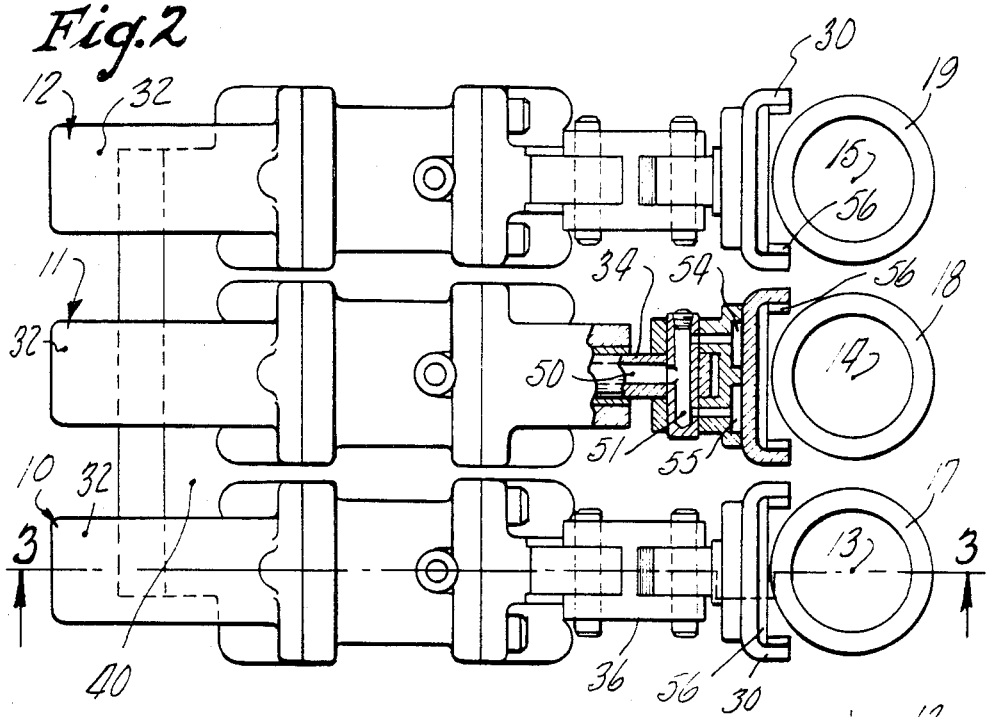
FIG. 2 shows an expanded plan view of the three individually controlled interceptors shown in FIG. 1.

Referring now to FIG. 1 there is shown a plan view of a portion of a triple gob, multiple section glassware forming machine from a point below the shears and gob feeder (not shown). The machine is commonly known as an IS machine and manufactures glassware by either the blow-and-blow or press-and-blow process. Individually controlled interceptors 10, 11 and 12, shown expanded in FIG. 2, are aligned adjacent the center lines 13, 14 and 15, respectively, of the paths of the gobs with which the interceptors are associated. While the embodiment disclosed and described herein is designed for a triple gob forming machine, the invention is equally suitable for any multiple gob forming machine. Those skilled in the art will understand that above each interceptor is aligned a respective pair of shears and a feeder orifice. A stream of molten glass emanates from each orifice and is cyclically sheared to produce gobs which fall along their respective center lines and past their respective interceptors. Interceptors 10, 11 and 12 may be termed outer, middle and inner interceptors, respectively, because they are associated with the outer, middle and inner molds of each section of the machine.

Interceptors 10, 11 and 12 are shown secured adjacent gob distributor assembly 16 which includes outer funnel 17, middle funnel 18 and inner funnel 19 mounted in suitable rack and pinion engagement (not shown) with rack 20. Each funnel has a scoop secured to its lower end (not shown). Cam roll 22 is provided at the end of rack 20 for engagement with lever 23 of cam lever and reductor assembly 24. The lever 23 follows a cam 26 partially shown within assembly 24, the cam being rotated by propellor shaft 25. In the embodiment shown in FIG. 1 three gobs would fall simultaneously from their respective sources, one into each funnel respectively, for delivery to a predetermined section of the glassware forming machine depending upon the position of the scoops associated with each funnel. Rotation of cam 26 causes the gob distributor to oscillate in a predetermined pattern to cause the sequential delivery of a group of gobs to sequentially activated sections of the machine. In normal operation the chute of each interceptor 10, 11 and 12 is held retracted to enable all gobs to be so delivered. Extension of an interceptor into an intercept position (best seen in FIG. 3) will cause its associated gobs to be rejected to a cullet chute (not shown).

Figure 3:
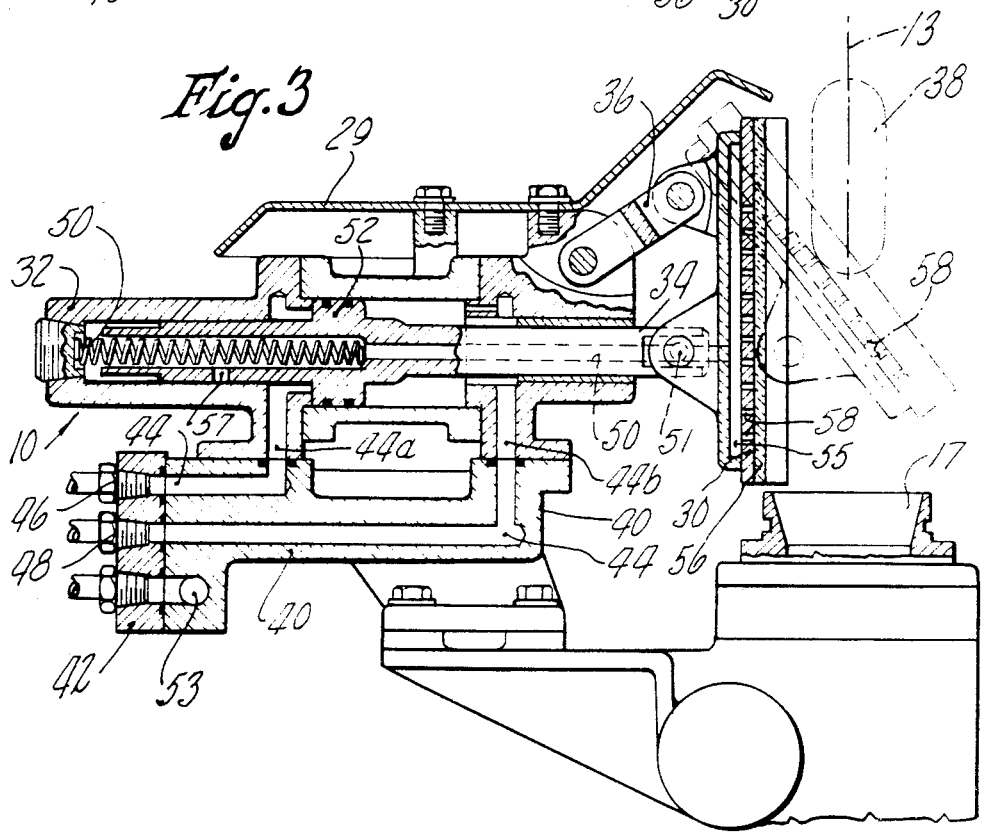
FIG. 3 shows an elevational cross-section of one of the interceptors of FIG. 2 taken along line 3—3.

An elevational cross-section view of interceptor 10 is shown in FIG. 3 including cover plate 29 which has been omitted from other views for clarity. Since all of the interceptors are identical, only interceptor 10 will be described in detail. Interceptor 10 comprises a chute 30 and an activating means which comprises, in part, a pneumatic double action cylinder 32. Cylinder piston rod 34 is hingedly secured to the back of chute 30. Link 36 serves to hingedly connect chute 30 with cylinder 32 so that lateral motion of piston rod 34 places chute 30 in either a delivery position, as shown in full lines, or an intercept position as shown in phantom to reject gob 38.

Each interceptor 10, 11 and 12 is mounted on a common base 40 to which appropriate air and coolant lines are connected through adaptor plate 42 to activate each cylinder 32 and cool appropriate interceptor and gob distributor components. Base 40 is provided with appropriate channels 44 for directing air to corresponding channels 44a and 44b in each cylinder 32.

In the embodiment shown, air is also directed through a channel 50 in piston 52 through rotary joint 51 into manifold chambers 54 and 55 (best seen in FIG. 2). Cooling air enters channel 50 when port 57 of piston rod 34 clears channel 44a, i.e. after the piston rod has moved a predetermined amount toward the extended intercept position. The cooling air exits through apertures 58 and past liner 56 which is loosely secured to the face of chute 30. Liner 56 is preferably constructed of a high temperature, glass resistant refractory-type material suitable for the environment.

Figure 4:
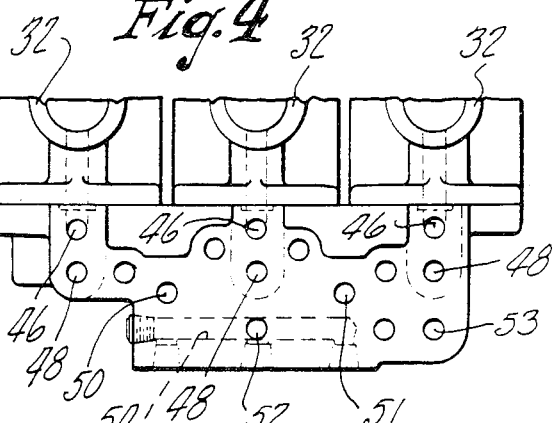
FIG. 4 is a partial side elevational view of FIG. 1 taken along the line 4—4.

Each cylinder operates in a purely conventional manner in response to air (or other fluid) pressure through the appropriate ports of plate 42. As shown in FIG. 4 which is a view of the plate 42 taken along the line 4—4 of FIG. 1, the plate provides air inlet ports 46 and 48 corresponding to each cylinder. Air pressure directed to any port 48 will cause the respective chute 30 to be held in the gob delivery (full line) position while air pressure to any port 46 will cause the respective chute to extend to the intercept (phantom line) position.

Plate 42 also includes water inlet and outlet ports 50 and 51, respectively, mated to corresponding channels (not shown) in base 40 for supplying cooling water to gob distributor 16. Additional water inlet and outlet ports 52 and 53, respectively, are provided to supply cooling water to the scoops (not shown). As shown in phantom, inlet port 52 opens into a manifold area 54 of plate 42 to which individual lines may be connected (not shown) to the individual scoops.

Figure 5:
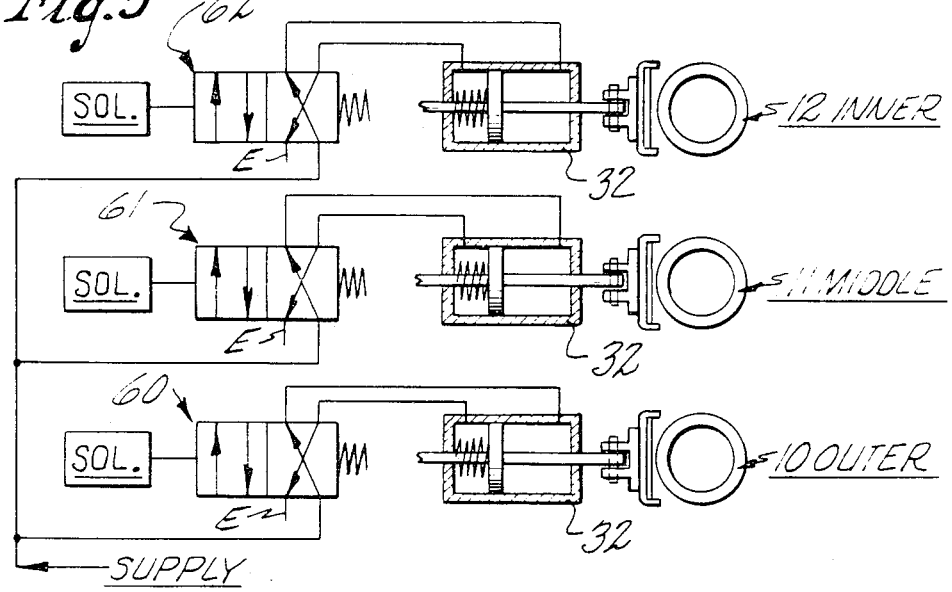
FIG. 5 is a diagrammatic view of the pneumatic activating structures of the invention.

Air pressure to selected ports of plate 42 is controlled by conventional solenoid actuated valves 60, 61 and 62 connected to a common air supply as shown diagrammatically in FIG. 5. Each valve 60, 61 and 62 is operatively connected to a cylinder 32 of interceptors 10, 11 and 12, respectively. It will be noted that in the preferred embodiment the supply air is connected to maintain each chute 30 in the extended reject position unless its corresponding solenoid is energized to direct the supply air to the other side of the cylinder.

Figure 6:
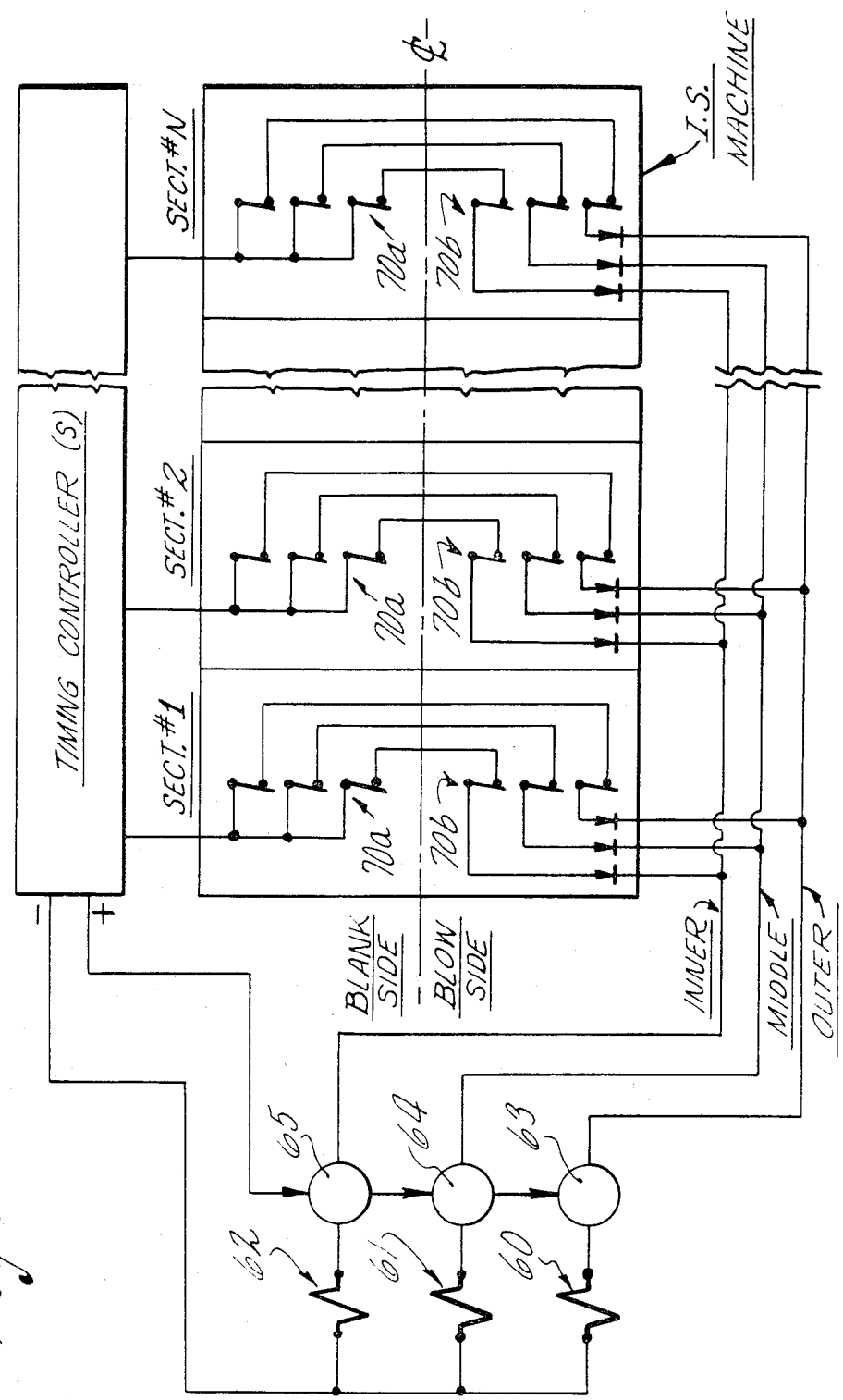
FIG. 6 is a schematic diagram of one embodiment of the control circuit of the present invention.

Referring now to FIG. 6 there is shown a schematic wiring diagram of one embodiment of the control circuit of the present invention. Each solenoid 60, 61 and 62 is driven by respective relays or drivers 63, 64 and 65 which are connected to a source of power and energized in response to selected manually operable switches, one associated with each blank mold and each blow mold of each section of the glassware forming machine. Each section of the machine is provided with a group of switches 70a and 70b. Each group 70a comprises 3 switches, one associated with each inner, middle and outer mold on the blank side of the machine and each group 70b comprises 3 switches each associated with the corresponding mold on the blow side of the machine. The normally closed blank and blow switches are connected in series and to their corresponding interceptor drivers and section timing controller (shown diagrammatically as one unit in FIG. 6 although it will be understood that individual section timing controllers could be used). Each of the switches is mounted on the machine at a location adjacent the mold associated therewith and accessible to the operator.

In operation, the timing controller associated with each section periodically produces a delivery enable signal at appropriate times in the machine cycle to maintain all interceptors 10, 11 and 12 in a retracted, delivery position. That is, the various delivery enable signals may be pulses that occur at discrete points in the machine cycle, but successive signals typically abut each other in time so that the resultant signal to each interceptor is a continuous delivery enable signal. Opening any switch will inhibit the delivery enable signal to the associated interceptor at the proper time in the machine cycle, i.e. when the gob distributor is oriented to guide the then falling group of gobs to the section associated with the opened switch. Each interceptor 10, 11 and 12 may thus be individually and separately activated to reject any number of its corresponding gobs (during the time each switch is closed) while not affecting the delivery of gobs to other molds within the same section. Obviously, inhibiting delivery to a selected blank mold affects the corresponding blow mold.

Figure 7:
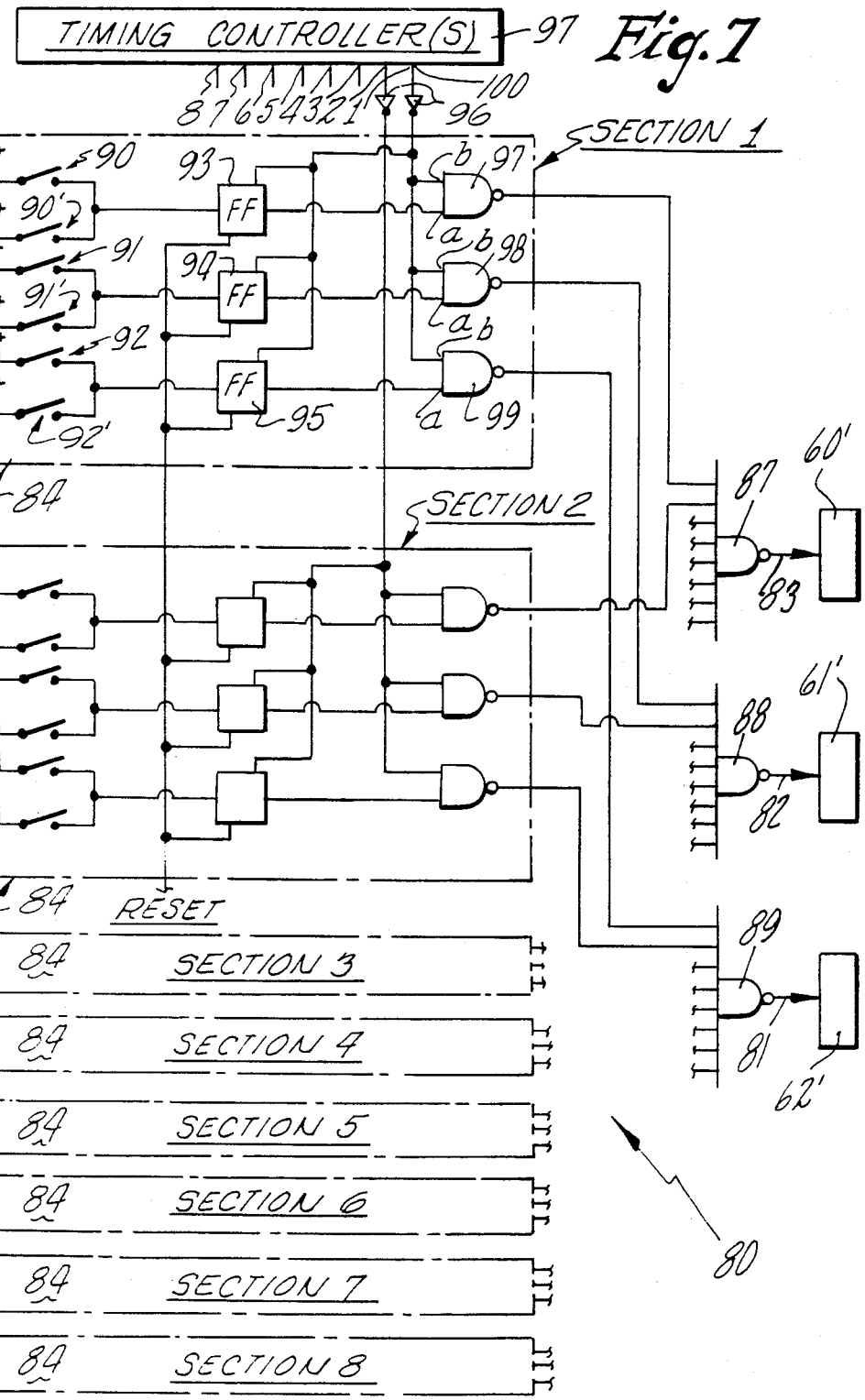
FIG. 7 is a schematic diagram of an alternate embodiment of the control circuit of the invention.

Referring now to FIG. 7 there is shown an alternate embodiment 80 of the control circuit of the invention. Circuit 80 is shown for operation with an 8-section machine and has three outputs 81, 82 and 83 for driving solenoids 60', 61' and 62', respectively. A circuit compatible with a machine having a different number of sections may easily be designed. Circuit 80 includes a plurality of identical section delivery control circuits 84 each associated with one section of the machine. Each circuit 84 has three switches 90, 91 and 92 corresponding to the inner, middle and outer blank molds of each section of the machine and three switches 90', 91' and 92' corresponding to the inner, middle and outer blow molds of each section. Since the switches of each section are similarly connected, only circuits 84 associated with sections 1 and 2 are shown in detail and only the operation with respect to section one will be described. Each switch is connected (through appropriate interfacing circuitry, not shown) to the data inputs of flip flops 93, 94 and 95, respectively. The clock input of each flip-flop is connected, through inverters 96, to respective outputs 100 of timing controller(s) 97. This arrangement assures that the flip-flops of a particular circuit 84 will be clocked only at the beginning of the delivery enable pulse of the respective section. As will be understood below, this will inhibit the operation of the interceptors during the time interval that gobs are being accepted, thus preventing a gob from being hit by a moving interceptor and dangerously propelled away from the machine. Timing controller 97 is shown as a unit controlling all sections, however, it will be understood that individual section timing controllers may also be utilized.

The outputs of flip-flops 93, 94 and 95 are connected to input terminal a of section NOR gates 97, 98 and 99, respectively. Input terminal b of each section gate is connected to the section output 100 of the timing controller which provides the delivery enable signal for the section with which the switches are associated (in this case, section 1). It will be noted that each pair of switches (90 and 90', etc.) is associated with a unique gate 97, 98 and 99. The outputs of section gates 97, 98 and 99 are connected to the inputs of corresponding interceptor NOR gates 87, 88 and 89, respectively, the outputs of which are connected to drive inner, middle and outer solenoids 60', 61' and 62', respectively. It will be noted that each circuit 84 of each section provides 3 (i.e., inner, middle and outer) outputs, one for each gate 87, 88 and 89. Similarly, timing controller 97 provides a plurality of timing outputs 100 (labeled by section number), one for each circuit 84.

The reset terminals of each flip flop 93, 94 and 95 may be connected together and to a reset switch (not shown) which, if activated, would result in rejection of all gobs to all sections until the reset switch is opened.

In operation, gates 97, 98 and 99 insure that their associated switches cannot control the solenoids associated therewith unless the delivery enable signal associated with the respective section is on, indicating that the section is active and will have the gob distributor oriented to deliver gobs to that section. Thus the switches of one section cannot control the interceptors at a time when another section is to be receiving gobs.

For explanation purposes a polarity convention is chosen such that closure of any switch within a pair (90 and 90', 91 and 91', etc.) will provide a low input to the data terminal of its corresponding flip flop and if both switches of a pair are open the data terminal will be high. In normal operation, each clock pulse will change the output of each flip flop according to the status of its associated switches. When all switches are open, terminal a of gates 97, 98 and 99 will be high. Terminal b of gates 97, 98 and 99 will simultaneously be low except during the occurrence of the delivery enable signal associated with each section. Thus, as the delivery enable signals arrive sequentially at each circuit 84, the three outputs thereof will go low sequentially according to the predetermined firing order of the sections. It will therefore be noted that there will always be one low input to each gate 87, 88 and 89 while the remaining inputs are high. The low input to these gates is associated with the section having a high delivery enable signal. Any low input on gates 87, 88 or 89 causes a high output to energize its corresponding solenoid to retract its associated interceptor to permit gob delivery.

Closure of any switch will cause a low input to terminal a of its corresponding gate 97, 98 or 99. This dictates a high at the output of the associated gate regardless of whether the delivery enable signal at terminal b is on or off. Thus, if a switch is closed the input to gate 87, 88 or 89 associated with that switch will be high and remain high when the delivery enable signal arrives at the corresponding section. This will prevent any low inputs to the associated interceptor gate at the time when delivery should occur to the corresponding section. The output of the associated gate 87, 88 or 89 will then be low at that time thereby deenergizing the solenoid to place the associated interceptor in the reject position.

It will be understood by those skilled in the art that numerous modifications and embodiments may be made to the preferred embodiment of the invention disclosed herein without departing from the spirit and scope thereof.

What is claimed is:

1. In a glassware forming machine adapted to operate in conjunction with a plurality of gob sources,
   a plurality of interceptor means, each associated with a predetermined one of said gob sources and
   means operatively connected to said plurality of interceptor means for activating selected ones thereof to intercept the gobs associated therewith while simultaneously not activating others of said plurality of interceptor means.

2. In a multiple section glassware forming machine adapted to periodically receive groups of gobs, each group including a predetermined plurality of gobs for being sequentially delivered to sequentially activated sections of said machine, said plurality of gobs being equal in number to the number of blank molds in each of said sections, each gob within each group being intended for delivery to a predetermined respective one of said blank molds within each section, the improvement comprising:
   a plurality of interceptor means equal in number to and associated with respective ones of said plurality of gobs for intercepting selected gobs to prevent their delivery to the intended mold, each interceptor means associated with a predetermined respective one of said molds in each of said sections;
   a plurality of activating means for selectively placing said interceptor means in an intercept position or in a delivery position, each activating means operatively connected to a predetermined respective one of said interceptor means;
   control means operatively connected to each of said activating means for selectively energizing and deenergizing selected ones of said activating means to intercept selected gobs within each of said groups of gobs while simultaneously permitting delivery of other gobs within the same group.

3. An apparatus according to claim 2 wherein each of said activating means further comprises:
   a fluid activated cylinder having a piston for being moved between a delivery position and an intercept position;
   a piston rod secured between said piston and said interceptor means;
   valve means for directing fluid under pressure to selected ports in said cylinder in response to said control means to cause said piston to move between said delivery and intercept positions.

4. An apparatus according to claim 2 wherein said control means further comprises:
   a plurality of first switches associated respectively with each of said blank molds in each of said sections;
   a plurality of second switches associated respectively with each blow mold in each of said sections;
   means responsive to each of said first and second switches and to each delivery enable signal for producing a gob reject signal in response to activation of either of said first and second switches and the simultaneous occurrence of the delivery enable signal associated therewith, said gob reject signal for energizing respective activating means.

5. An apparatus according to claim 2 wherein said control means further comprises:
   timing means associated with each of said sections and operatively connected to said plurality of activating means for producing delivery enable signals therefor at predetermined times within the cycle of operation of said machine;
   a plurality of respective switch means interposed between said timing means and said plurality of activating means for inhibiting said delivery enable signals to selected ones of said plurality of activating means.

6. An apparatus according to claim 5 wherein said control means further comprises:
   a plurality of section delivery control means each associated with a respective section of said machine and each responsive to the timing controller associated with said respective section, each section delivery control means having a plurality of selectable outputs and means for activating same, each said output respectively associated with one of the mold pairs of said respective section;
   a plurality of gate means each responsive to corresponding ones of said outputs from each of said section delivery control means, each gate being associated with, and for selectively energizing, one of said activating means.

7. An apparatus according to claim 2 wherein said control means further comprises:
   a plurality of section delivery control means each associated with a respective section of said machine and each responsive to the timing controller associated with said respective section, each section delivery control means having a plurality of selectable outputs and means for activating same, each said output respectively associated with one of the mold pairs of said respective section;
   a plurality of gate means each responsive to corresponding ones of said outputs from each of said section delivery control means, each gate being associated with, and for selectively energizing, one of said activating means.

8. A method of rejecting selected gobs from a group of gobs simultaneously delivered toward a section of a glassware forming machine, each gob within said group intended for delivery to a predetermined respective one of a plurality of molds in said section, comprising the steps of:
   placing an interceptor adjacent the path of each one of said gobs;
   selecting which of said molds is to not receive any gobs;
   activating the interceptor associated with said selected mold to reject gobs intended for delivery thereto while simultaneously not activating the remaining interceptors to enable delivery of other gobs within the same group.

* * * * *